United States Patent
Dudar

(10) Patent No.: US 11,480,137 B1
(45) Date of Patent: Oct. 25, 2022

(54) METHODS AND SYSTEMS FOR DETERMINING INTEGRITY OF FUEL TANK PRESSURE TRANSDUCER

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/454,951

(22) Filed: Nov. 15, 2021

(51) Int. Cl.
| | |
|---|---|
| F02M 25/08 | (2006.01) |
| G01L 27/00 | (2006.01) |
| F02D 41/00 | (2006.01) |
| G01M 3/02 | (2006.01) |
| G01M 3/00 | (2006.01) |
| G01K 3/00 | (2006.01) |

(52) U.S. Cl.
CPC ..... *F02M 25/0809* (2013.01); *F02D 41/0032* (2013.01); *F02M 25/0836* (2013.01); *G01K 3/005* (2013.01); *G01L 27/007* (2013.01); *G01M 3/00* (2013.01); *G01M 3/025* (2013.01); *F02D 2200/0602* (2013.01)

(58) Field of Classification Search
CPC ............ F02M 25/0809; F02M 25/0836; F02D 41/0032; G01L 27/007; G01M 3/025
See application file for complete search history.

(56) References Cited

U.S. PATENT DOCUMENTS

| | | | |
|---|---|---|---|
| 8,447,495 B2 | 5/2013 | Pearce et al. | |
| 9,217,397 B2 | 12/2015 | Peters et al. | |
| 9,751,396 B2 | 9/2017 | Dudar | |
| 9,945,752 B2 | 4/2018 | Dudar | |
| 10,100,770 B2 | 10/2018 | Dudar | |
| 10,385,795 B2 | 8/2019 | Dudar et al. | |
| 10,760,532 B1 | 9/2020 | Dudar | |
| 11,346,308 B1* | 5/2022 | Dudar | F02M 25/0836 |
| 2014/0330482 A1* | 11/2014 | Yang | F02M 25/0809 |
| | | | 701/34.4 |
| 2014/0352658 A1* | 12/2014 | Jackson | G01L 27/007 |
| | | | 123/344 |
| 2014/0360260 A1* | 12/2014 | Dudar | F02M 25/0854 |
| | | | 73/204.11 |
| 2014/0374177 A1* | 12/2014 | Yang | F02M 25/0836 |
| | | | 180/65.21 |
| 2015/0019066 A1* | 1/2015 | Dudar | F02M 25/0809 |
| | | | 701/33.9 |
| 2015/0075251 A1 | 3/2015 | Jentz et al. | |
| 2015/0085894 A1 | 3/2015 | Yang et al. | |

(Continued)

*Primary Examiner* — Logan M Kraft
*Assistant Examiner* — Anthony L Bacon
(74) *Attorney, Agent, or Firm* — Vincent Mastrogiacomo; McCoy Russell LLP

(57) ABSTRACT

Methods and systems are provided for diagnosing potential degradation of a fuel tank pressure sensor. In one example, a method may include, in response to an ambient pressure reading by the fuel tank pressure sensor during an evaporative emissions (EVAP) system diagnostic, applying vacuum to the EVAP system and indicating degradation of the fuel tank pressure sensor if the canister undergoes an endothermic reaction. If the fuel tank pressure sensor is determined to not be degraded, the method further includes distinguishing between the ambient pressure reading being caused by a leak in the EVAP system and a canister purge valve being stuck closed.

20 Claims, 7 Drawing Sheets

(56) References Cited

U.S. PATENT DOCUMENTS

| | | | |
|---|---|---|---|
| 2015/0226138 A1* | 8/2015 | Yang | B60K 15/035 |
| | | | 903/904 |
| 2017/0159616 A1* | 6/2017 | Miyabe | F02M 25/0854 |
| 2017/0342931 A1* | 11/2017 | Dudar | F02D 41/222 |
| 2020/0102203 A1 | 4/2020 | Dudar | |
| 2021/0270213 A1* | 9/2021 | Buseki | F02M 25/0818 |

* cited by examiner

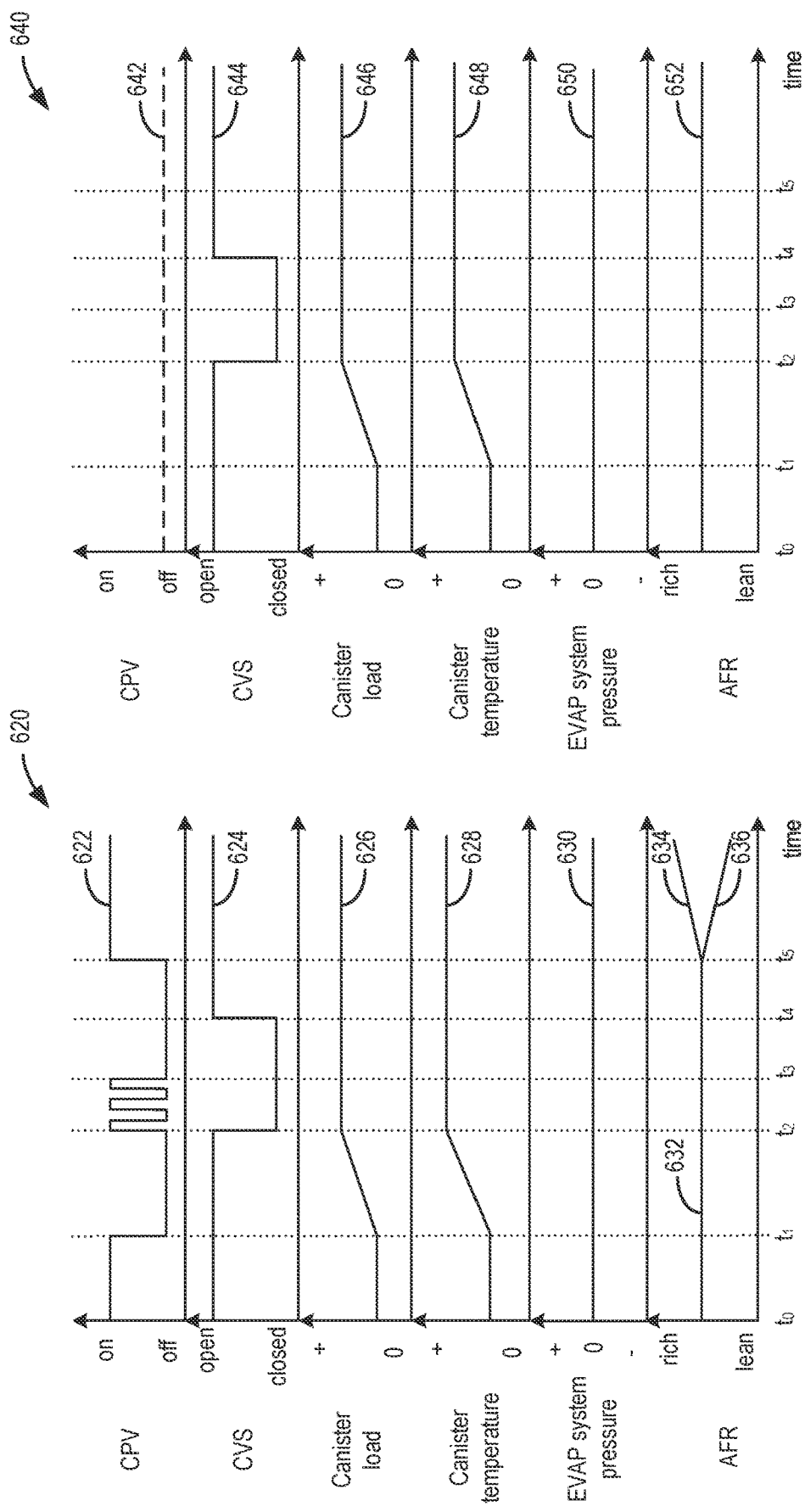

METHODS AND SYSTEMS FOR DETERMINING INTEGRITY OF FUEL TANK PRESSURE TRANSDUCER

FIELD

The present description relates generally to methods and systems for determining integrity of a fuel tank pressure transducer (FTPT) of an evaporative emissions control (EVAP) system of a vehicle.

BACKGROUND/SUMMARY

A fuel tank pressure transducer (FTPT) is implemented in an evaporative emissions control (EVAP) system of a vehicle in a line that couples the fuel system to the fuel vapor storage canister to measure the pressure or vacuum within the fuel system. To monitor accuracy and potential degradation of the FTPT, FTPT rationality and FTPT offset tests are performed. For example, an open circuit test or a closed circuit test may be performed on the FTPT to assess rationality. The FTPT may be tested for offset to determine if a baseline output of the FTPT is accurate. For the FTPT offset test, FTPT readings are compared to manufacturer-established values to determine offset. Since the fuel tank is vented to the atmosphere, after a long vehicle soak where fuel stabilizes, the FTPT is expected to read near atmospheric conditions at the next key up. If the FTPT reads greater than −1.5 in $H_2O$ or less than 1.5 in $H_2O$, a diagnostic trouble code (DTC) may be set to indicate the FTPT is offset. For example, if there is an inherent offset for the FTPT, then in some cases the fuel door may not open in response to a request to refuel, which may be frustrating and inconvenient to a vehicle operator or customer. In other examples, an inherent offset of the FTPT may lead to a determination that the fuel system is free from a presence of undesired evaporative emissions, when in fact it is not.

One example approach for an FTPT offset test is shown by Jentz et al. in US 2015/0075251. Therein, the fuel tank is vented to atmosphere for a lengthy vehicle-off soak. If the FTPT is functional, a value within a threshold of atmospheric pressure may be output following the vehicle-off soak. A deviation from atmospheric pressure may result in a diagnostic trouble code (DTC) being set at the controller, and/or may result in the FTPT output being adjusted to compensate for any offset.

Another example approach for determining degradation of the FTPT is shown by Dudar in U.S. 2020/0102203. Therein, degradation of the FTPT may be indicated upon pressure within the fuel tank not changing as fuel is added to the tank (e.g., due to FTPT being stuck) or upon pressure within the fuel tank increasing then stabilizing as fuel is added to the tank (e.g., due to the FTPT having an inherent offset).

However, the inventors herein have recognized potential issues with such systems. As one example, prior to fuel being added to the fuel tank (e.g., prior to a refueling lock being unlocked), the FTPT may indicate a zero pressure (e.g., ambient pressure) condition in the fuel system. Degradation of the FTPT may include the FTPT indicating zero pressure within the fuel system when positive pressure or vacuum are present. Degradation of the FTPT may include a disconnected 5V Vref in the FTPT or a damaged/stuck diaphragm in the FTPT. An inaccurate indication of zero pressure by the FTPT may result in further degradation to the FTPT or to the EVAP system, and may also result in undesired evaporative emissions.

For example, when an FTPT implemented in a hybrid electric vehicle (HEV) (e.g., with a sealed NIRCOS fuel tank) indicates a zero pressure state of the fuel system, a fuel door may be unlocked such that the vehicle may be refueled. If the FTPT is degraded and indicates zero pressure when there is positive pressure in the fuel system, opening the fuel door may result in fuel spraying out of the fuel tank.

In another example, indication of zero pressure by the FTPT when positive pressure or vacuum is present in the fuel system may result in an overloading of vacuum, which may degrade the fuel tank, or an overloading of positive pressure, which may in turn overload a fuel vapor canister thus increasing evaporative emissions. For example, if zero pressure is indicated by the FTPT while the EVAP system is sealed, a purge command may be increased to build vacuum. However, if vacuum is already in the EVAP system and the FTPT incorrectly indicated zero pressure, high vacuum may degrade the fuel tank. During canister purging, positive pressure as indicated by the FTPT may indicate the canister is being loaded. However, if the FTPT indicates zero pressure, the purge command may be scaled back or turned off, resulting in the canister not being purged. This may result in undesired evaporative emissions due to fuel vapors not being absorbed by an overloaded canister.

During OBDII Diagnostics, such as regulatory leak diagnostics of the EVAP system, a canister vent solenoid valve (CVS) is used to seal the EVAP system and the FTPT is used to measure the vacuum/pressure inside the fuel tank. If zero pressure is indicated by the FTPT during conditions (e.g., engine operation, diagnostics, etc.) where a positive pressure or vacuum are expected, the controller may end the operation and set a DTC indicating a leak in the EVAP system. In one example, a technician may focus on identifying a leak in the EVAP system where there may not be a leak and instead the FTPT may be degraded.

However, in some examples, the FTPT may not be degraded and the zero pressure indication may be the result of another element of the EVAP system being degraded. Therefore, a method is desired for diagnosing potential degradation of a FTPT. The aforementioned challenges may be addressed by a method comprising, in response to the fuel tank pressure sensor (e.g., FTPT) reading ambient pressure during an evaporative emissions system diagnostic, loading a canister with fuel vapors, applying vacuum in the evaporative emissions system, opening a valve to ambient, and indicating fuel tank pressure sensor degradation if the canister undergoes an endothermic reaction resulting in the canister temperature being reduced by a threshold temperature.

As one example, indication of fuel tank pressure sensor degradation may further comprise disabling subsequent evaporative emissions system diagnostics. The method may further include indicating acceptable operation of the fuel tank pressure sensor if the canister temperature remains substantially constant. If the fuel tank pressure sensor is determined to not be degraded, the method may further include distinguishing between a leak in the evaporative emissions system and the canister purge valve being stuck closed during the evaporative emissions system diagnostic with the fuel tank pressure sensor reading ambient pressure. In this way, fault modes of the EVAP system may be discerned and time/resources used to repair the vehicle may be reduced by implicating the true source of zero pressure readings. Indication of a degraded fuel tank pressure sensor or identification of degradation of the EVAP system as a leak or as a canister purge valve being stuck closed may allow for rapid and accurate diagnostics of a source of undesired evaporative emissions and may result in repair or replacement of degraded elements while minimizing further degradation of the element or other elements of the engine system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6B shows a graph illustrating a second example zero pressure diagnostic cycle.

FIG. 6C shows a graph illustrating a third example zero pressure diagnostic cycle.

DETAILED DESCRIPTION

Figure 1:
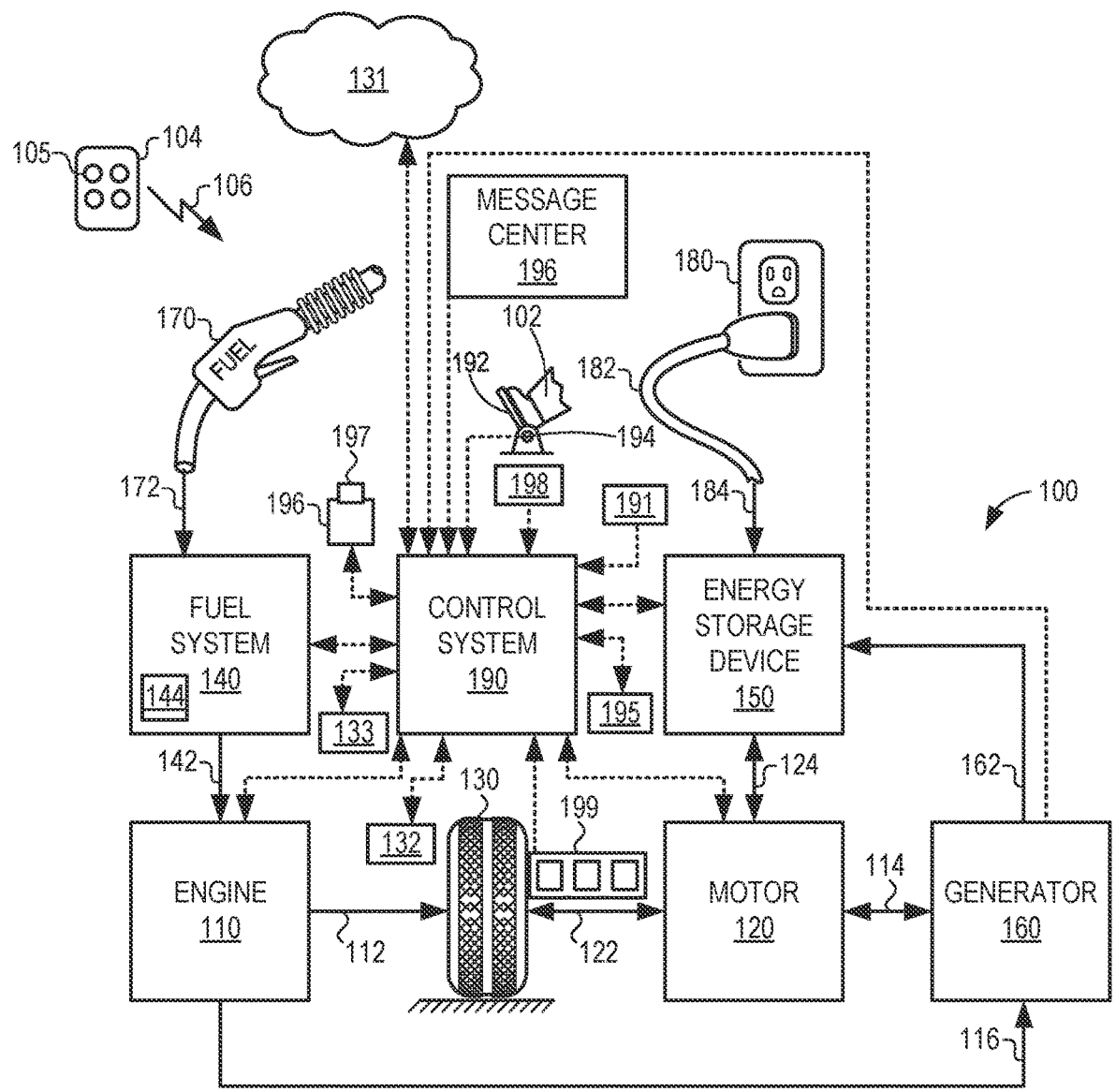
FIG. 1 schematically shows an example vehicle propulsion system.
Figure 3:
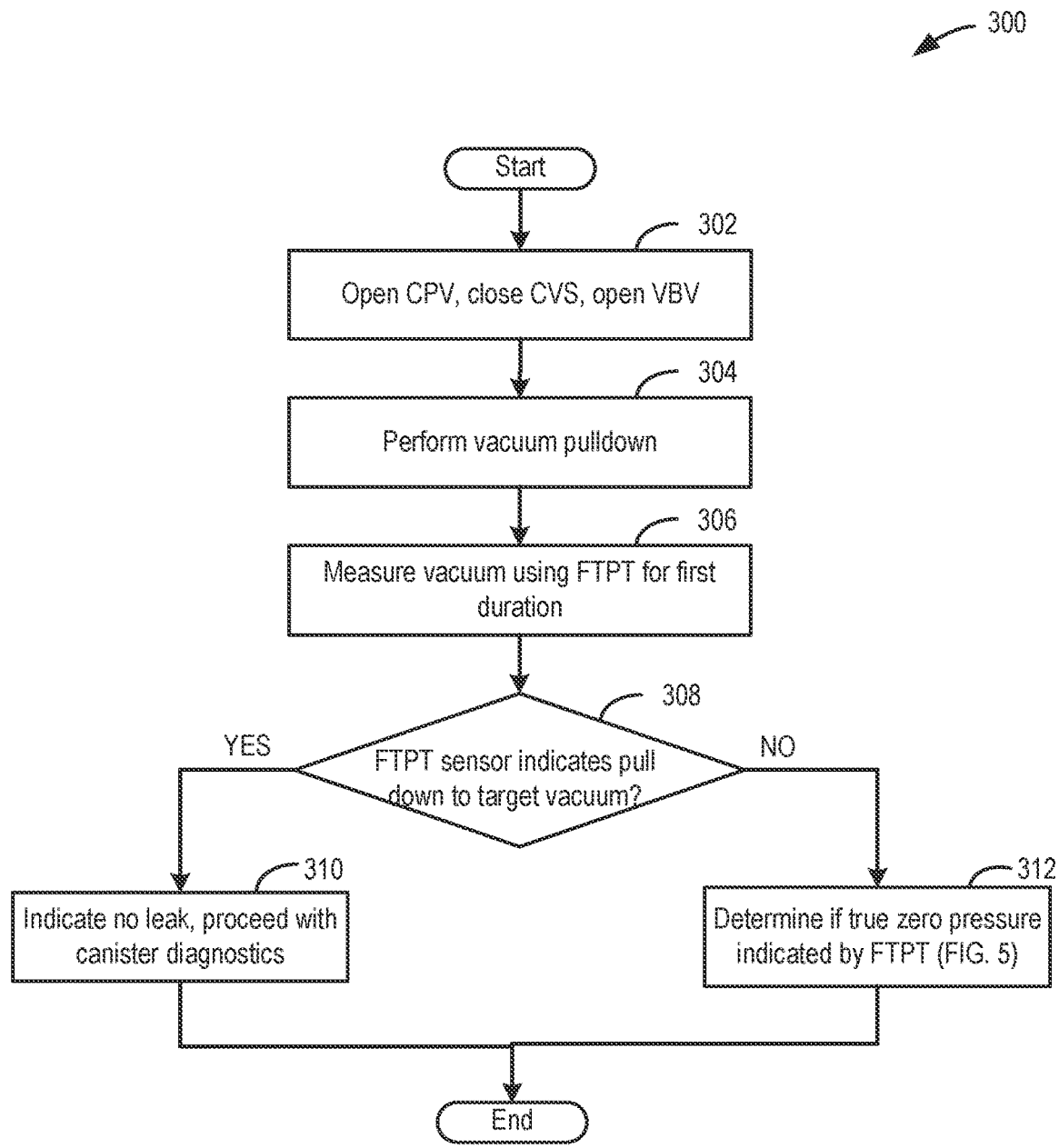
FIG. 3 shows an example method for EVAP gross leak detection pulldown.
Figure 4:
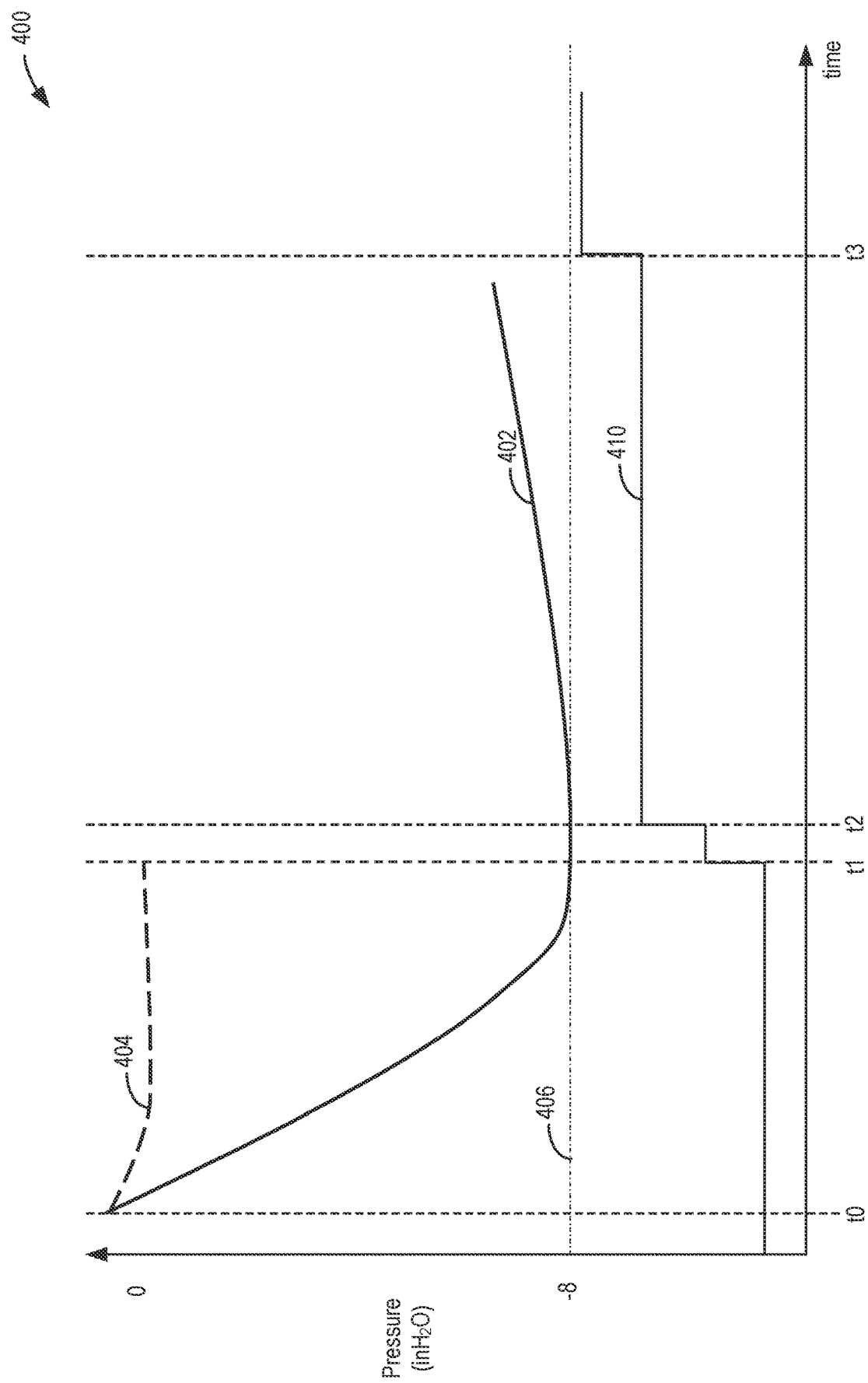
FIG. 4 shows a graph illustrating an example of EVAP gross leak detection pulldown, as described in FIG. 3.
Figure 5:
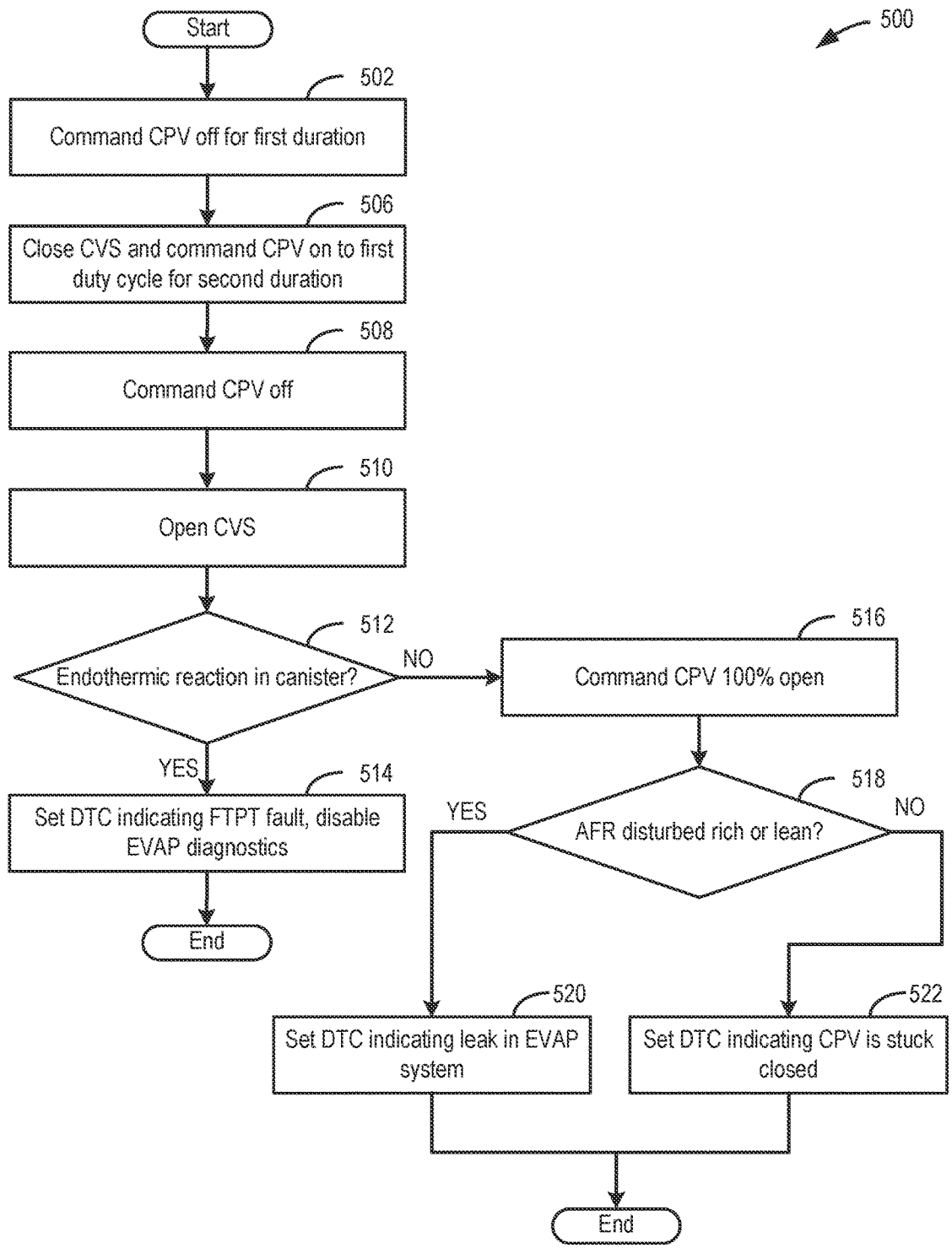
FIG. 5 shows an example method for determining a cause of a fuel tank pressure transducer (FTPT) zero pressure reading.
Figure 6A:
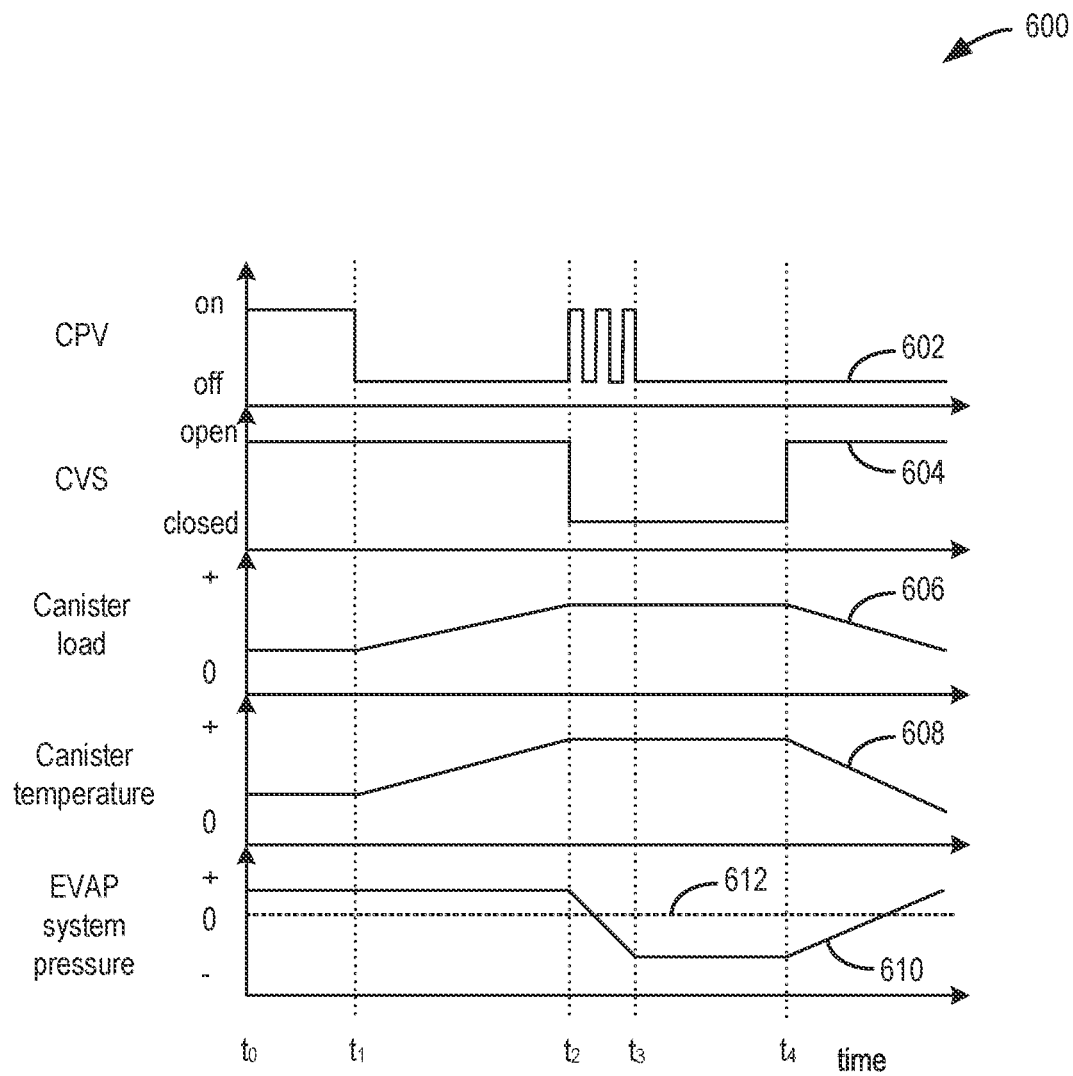
FIG. 6A shows a graph illustrating a first example zero pressure diagnostic cycle.

The following description relates to systems and methods for diagnosing degradation of a FTPT following a zero pressure reading by the FTPT. FIG. 1 an example vehicle propulsion system, including a fuel system and an evaporative emissions control (EVAP) system, as shown in further detail in FIG. 2. The EVAP system is configured with a fuel tank pressure sensor (herein, fuel tank pressure transducer, FTPT) implemented in a conduit that couples the fuel system to a fuel vapor storage canister, and the FTPT may be used to measure the pressure or vacuum within the fuel system. FIG. 3 described a high-level method for EVAP gross leak detection pulldown, wherein valves of the EVAP system and fuel system may be used to determine if the FTPT indicates zero pressure. FIG. 4 shows a graph illustrating an example of EVAP gross leak detection pulldown, as described in FIG. 3. When the FTPT indicates zero pressure, such as in the method described in FIG. 3 and shown in FIG. 4, a method shown in FIG. 5 is implemented to determine a cause of the FTPT zero pressure reading. FIGS. 6A-6C illustrate a first, a second, and a third example of a zero pressure diagnostic cycle, such as described in the method of FIGS. 3 and 5. FIG. 6A illustrates a diagnostic cycle where the FTPT inaccurately indicates zero pressure (e.g., there is a vacuum within the EVAP system). FIGS. 6B and 6C illustrate diagnostic cycles where the FTPT accurately indicates zero pressure in the EVAP system, and further show causes of zero pressure, including an EVAP system leak (e.g., FIG. 6B) and a stuck closed canister purge valve (e.g., FIG. 6C).

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with vehicle propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, a fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine. Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical energy transmission cable 182 may electrically couple energy storage device 150 and power source 180. While the vehicle propulsion system is operated to propel the vehicle, electrical energy transmission cable 182 may be disconnected between power source 180 and energy storage device 150. Control system 190 may identify and/or control the amount of electrical energy stored at the energy storage device, which may be referred to as the state of charge (SOC).

In other examples, electrical energy transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196. Further detail regarding the fuel system 140 is described in FIG. 2.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed. In some examples, a refueling lock (e.g. fuel door, etc.) may be manually opened via a vehicle operator depressing a manual refueling lock button 191. Such a manual refueling lock button may be positioned in a trunk of the vehicle, for example.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, control system 190 may be communicatively coupled to other vehicles or infrastructures via a wireless network 131 and the internet (e.g. cloud), as is commonly known in the art. In some examples, control system may be coupled to other vehicles or infrastructures via wireless network 131, in order to retrieve information that may be applicable to route-learning, as will be discussed in detail below.

Vehicle propulsion system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc. In one example, information received from the GPS may be utilized in conjunction with route learning methodology, such that routes commonly traveled by a vehicle may be learned by the control system 190. In some examples, other sensors, such as lasers, radar, sonar, acoustic sensors, etc., (e.g. 133) may be additionally or alternatively utilized in conjunction with the onboard navigation system to conduct route learning of commonly traveled routes by the vehicle.

Figure 2:
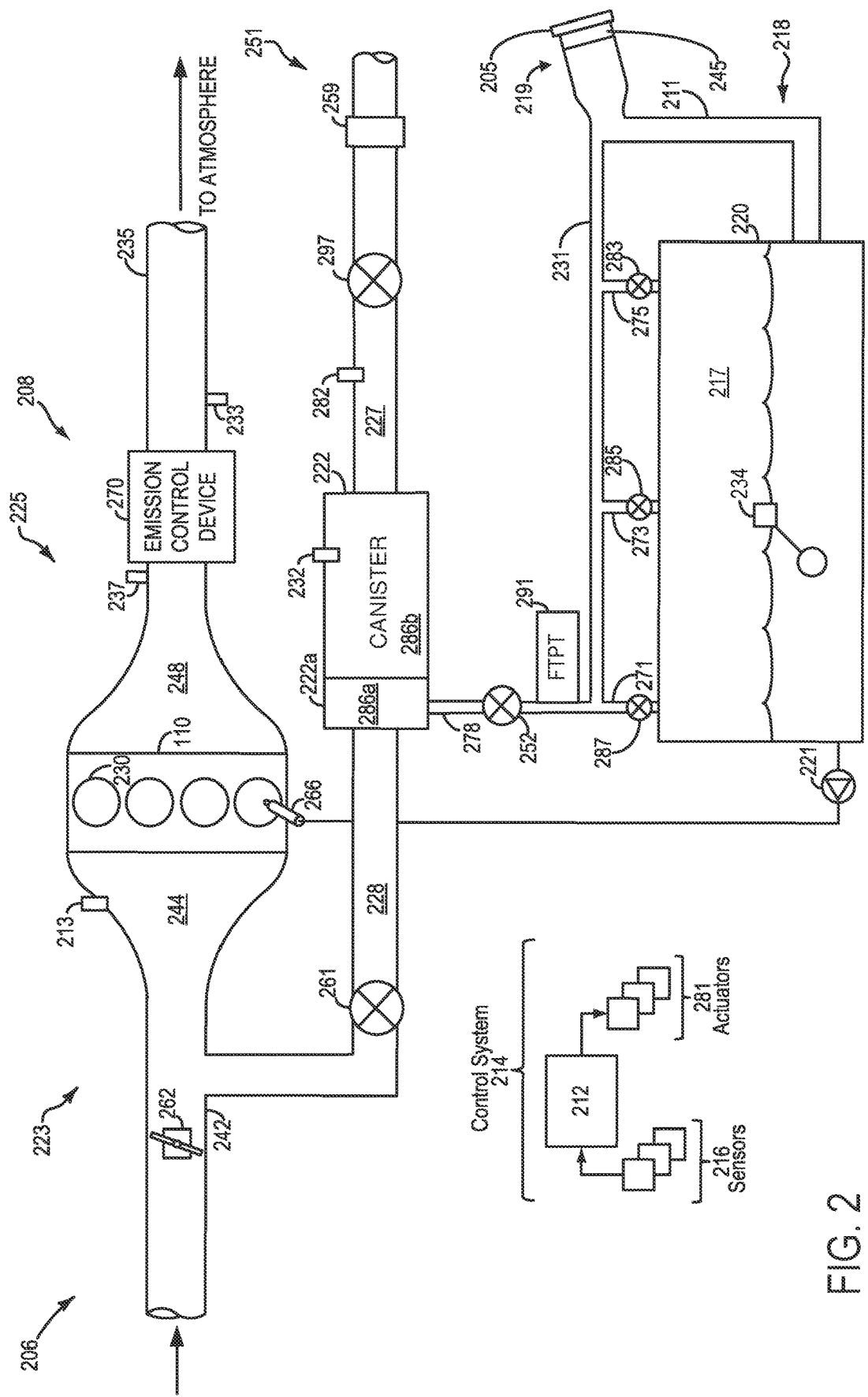
FIG. 2 schematically shows an example vehicle system with a fuel system and an evaporative emissions control (EVAP) system.

FIG. 2 shows a schematic depiction of a vehicle system 206. It may be understood that vehicle system 206 may comprise the same vehicle system as vehicle propulsion system 100 depicted at FIG. 1. The vehicle system 206 includes an engine system 208 coupled to an evaporative emissions control (EVAP) system 251 and a fuel system 218. It may be understood that fuel system 218 may comprise the same fuel system as fuel system 140 depicted at FIG. 1. EVAP system 251 includes a fuel vapor storage container or canister 222 which may be used to capture and store fuel vapors. In some examples, vehicle system 206 may be a hybrid electric vehicle system. However, it may be understood that the description herein may refer to a non-hybrid vehicle, for example a vehicle only-equipped with an engine and not an onboard energy storage device, without departing from the scope of the present disclosure.

The engine system 208 may include an engine 110 having a plurality of cylinders 230. The engine 110 includes an engine air intake 223 and an engine exhaust system 225. The engine air intake 223 includes a throttle 262 in fluidic communication with engine intake manifold 244 via an intake passage 242. Further, engine air intake 223 may include an air box and filter (not shown) positioned upstream of throttle 262. The engine exhaust system 225 includes an exhaust manifold 248 leading to an exhaust passage 235 that routes exhaust gas to the atmosphere. The engine exhaust system 225 may include one or more exhaust catalyst 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP.

Fuel system 218 may include a fuel tank 220 coupled to a fuel pump system 221. It may be understood that fuel tank 220 may comprise the same fuel tank as fuel tank 144 depicted above at FIG. 1. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may occupy a vapor space 217 of the fuel tank 220 and be routed to an EVAP system 251 which includes a fuel vapor canister 222 via vapor recovery line 231, before being purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, vapor recovery line 231 may be coupled to a refueling system 219. In some examples, refueling system 219 may include a fuel cap 205 for sealing off the fuel filler system from the atmosphere. Refueling system 219 is coupled to fuel tank 220 via a fuel filler pipe (e.g., neck) 211.

Further, refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

EAVP system 251 may include one or more emissions control devices, such as one or more fuel vapor canisters 222 filled with an appropriate adsorbent 286b, the canisters are configured to temporarily trap fuel vapors (including vaporized hydrocarbons) during fuel tank refilling operations and "running loss" (that is, fuel vaporized during vehicle operation). In one example, the adsorbent 286b used is activated charcoal. EVAP system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

One or more canister temperature sensors 232 may be coupled to and/or within canister 222. In one example, canister temperature sensor 232 is a thermocouple. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine air intake 223 via purge line 228 and canister purge valve (CPV) 261. For example, CPV 261 may be normally closed but may be opened during certain conditions so that vacuum from engine intake manifold 244 is applied to the fuel vapor canister for purging. In some examples, vent line 227 may include an air filter 259 disposed therein upstream of a canister 222.

In some examples, the flow of air and vapors between canister 222 and the atmosphere may be controlled by a canister vent valve 297 coupled within vent line 227. In one example, the canister vent valve 297 is a canister vent solenoid valve (CVS). In examples where the canister vent valve is a CVS, as described herein, CVS 297 may be a solenoid valve wherein opening or closing of the valve is performed via actuation of a canister vent solenoid. In particular, the CVS may be an open valve that is closed upon actuation of the canister vent solenoid. In some examples, CVS 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVS closed is reduced. In particular, the CVS may be closed while the vehicle is off, thus maintaining battery power while maintaining the fuel emissions control system sealed from atmosphere.

As described above, the CVS 297 may be a normally open valve so that fuel tank isolation valve (FTIV) 252 may control venting of fuel tank 220 with the atmosphere. FTIV 252 may be positioned between the fuel tank and the fuel vapor canister 222 within conduit 278. FTIV 252 may be a normally closed valve, that when opened, allows for the venting of fuel vapors from fuel tank 220 to fuel vapor canister 222. For example, the FTIV 252 may be a vapor balance valve (VBV). Fuel vapors may then be vented to atmosphere, or purged to engine air intake 223 via CPV 261.

Fuel system 218 may be operated by controller 212 in a plurality of modes by selective adjustment of the various valves and solenoids. It may be understood that control system 214 may comprise the same control system as control system 190 depicted above at FIG. 1. For example, the fuel system may be operated in a fuel vapor storage mode (e.g., during a fuel tank refueling operation and with the engine not combusting air and fuel), wherein the controller 212 may open VBV 252 (when included) while closing CPV 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open VBV 252 (when included), while maintaining CPV 261 closed, to depressurize the fuel tank before allowing enabling fuel to be added therein. As such, VBV 252 (when included) may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine combusting air and fuel), wherein the controller 212 may open CPV 261 while closing VBV 252 (when included). Herein, the vacuum generated by the intake manifold of the operating engine may be used to draw fresh air through vent line 227 and through fuel vapor canister 222 to purge the stored fuel vapors into engine intake manifold 244. In this mode, the purged fuel vapors from the canister are combusted in the engine. The purging may be continued until the stored fuel vapor amount in the canister is below a threshold.

Controller 212 may comprise a portion of a control system 214. In some examples, control system 214 may be the same as control system 190, illustrated in FIG. 1. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device (e.g., exhaust catalyst 270), temperature sensor 233, pressure sensor 291 (e.g., a fuel tank pressure transducer (FTPT) sensor), pressure sensor 282, and canister temperature sensor 232 (e.g., thermocouple). Other sensors such as pressure, temperature, engine exhaust air-fuel ratio, and composition sensors may be coupled to various locations in the vehicle system 206. As another example, the actuators may include throttle 262, VBV 252, CPV 261, and CVS 297. The control system 214 may include a controller 212. The controller may receive input data from the various sensors, process the input data, and trigger the actuators in response to the processed input data based on instruction or code programmed therein corresponding to one or more routines. Example control routines are described herein with regard to FIG. 3 and FIG. 5. The controller may be an electronic controller configured with non-transitory instructions that when carried out determine degradation of the FTPT, as further described herein.

Undesired evaporative emissions detection routines may be intermittently performed by controller 212 on fuel system 218 and/or EVAP system 251 to confirm that undesired evaporative emissions are not present in the fuel system and/or EVAP system. As such, evaporative emissions detection routines may be performed while the engine is off (engine-off test) using engine-off natural vacuum (EONV) generated due to a change in temperature and pressure at the fuel tank following engine shutdown and/or with vacuum applied from a vacuum pump. Alternatively, evaporative emissions detection routines may be performed while the engine is running by operating a vacuum pump (where included) and/or using engine intake manifold vacuum. In some configurations, the CVS 297 may be coupled within vent line 227. CVS 297 may function to adjust a flow of air and vapors between canister 222 and the atmosphere. The CVS may also be used for diagnostic routines. When included, the CVS may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVS may be opened to allow a flow of fresh air to strip the fuel vapors stored in the canister.

Conducting an EONV test may include four "phases". The first phase may comprise an initial vent phase. This initial vent phase is conducted to vent any vapors from a fuel slosh event from a hard stop just prior to key off. The initial vent phase may comprise 30-60 seconds, for example. The next phase of the EONV test may constitute a pressure phase. In this phase, the fuel system and evaporative emissions systems are sealed from atmosphere, and a pressure build is monitored over time. If the pressure in the fuel system and EVAP system reaches a positive pressure threshold, an absence of undesired evaporative emissions may be indicated. However, if the pressure build stalls (e.g. plateaus), then the pressure in the fuel system and evaporative emissions system may be relieved, during what is referred to as the vent phase. After pressure in the fuel tank and EVAP system is relieved, a vacuum phase follows. The vacuum phase may include re-sealing the fuel system and EVAP system, and monitoring a vacuum build over time. If vacuum builds to a negative pressure threshold within a predetermined duration (e.g. 45 minutes since the start of the EONV test), then an absence of undesired evaporative emissions may be indicated.

FIG. 3 shows an example method 300 for EVAP system gross leak detection pulldown. Method 300 includes actuating valves of the EVAP system to isolate the fuel tank and performing a vacuum pulldown (e.g., applying vacuum) to determine if a leak is present in the EVAP system. Instructions for carrying out method 300 and the rest of the methods described herein may be executed by an electronic controller based on non-transitory instructions stored on a memory of the controller and in conjunction with signals received from sensors of the engine system, such as the sensors described above with reference to FIG. 1. The controller may employ engine actuators of the engine system to adjust engine operation, according to the methods described below.

Method 300 begins at 302, where method 300 includes opening the CPV, closing the CVS, and opening the VBV. Closing the CVS may seal the EVAP system from the atmosphere, allowing the FTPT to measure vacuum and/or pressure generated inside the fuel tank. Opening the CPV fluidically couples the canister to the intake manifold and opening the VBV fluidically couples the fuel tank to the canister and therefore to the intake manifold.

At 304, method 300 includes performing a vacuum pulldown. Performing the vacuum pulldown may include cranking the engine (e.g., if the engine is not combusting, such as when torque is being provided to vehicle wheels by an electric machine, in the case of a HEV) to apply vacuum to the EVAP system. Alternatively, if the engine is combusting, sealing the EVAP system from the atmosphere by closing the CVS may create a vacuum in the fuel tank. The open CPV operates at a low duty cycle (e.g., open 20% of the duration and closed 80% of the duration of the vacuum pulldown) to pull vacuum into the EVAP system.

At 306, method 300 includes using the FTPT to measure pressure (e.g., positive pressure, zero pressure, or vacuum) in the fuel tank for a first duration. In one example, the first duration is 90 seconds. In another example, the first duration may be greater than or less than 90 seconds.

At 308, method 300 includes determining if pressure in the fuel tank has been pulled down to a target vacuum during the first duration, as indicated by the FTPT. In one example, the target vacuum is −8 in $H_2O$. In another example, the target vacuum may be greater than or less than −8 in $H_2O$ while remaining below 0 in $H_2O$ (e.g., below a positive pressure).

If, during the first duration, the FTPT indicates pressure in the fuel tank is pulled down to the target vacuum, method 300 proceeds to 310 where method 300 includes indicating no leak in the EVAP system and proceeding with subsequent EVAP system diagnostics. For example, indicating no leak in the EVAP system may include indicating that the EVAP system is not leaking to the vehicle operator via the vehicle instrument panel display. Alternatively, the controller may proceed with subsequent diagnostics without displaying an indication of the EVAP system state to the operator. Proceeding with diagnostics may include the controller performing OBDII diagnostics, detailed descriptions of which are not within the scope of this disclosure. In this example, it may be determined that the FTPT accurately detects pressure in the fuel tank.

If, during the first duration, pressure in the fuel tank is not pulled down to the target vacuum, method 300 proceeds to 312, where method 300 includes determining if the FTPT indication is a true indication of zero pressure. For example, there may be zero pressure in the fuel tank (e.g., fuel tank pressure may be equal to ambient pressure), as indicated by the FTPT. In this case, the FTPT may have acceptable operation and thus may not be degraded. Alternatively, the FTPT may be degraded and indicate zero pressure in the fuel tank when either positive pressure or vacuum are present. Further, if pressure in the fuel tank does not pull down to the target vacuum within the first duration, the FTPT may indicate zero pressure regardless of the actual pressure or vacuum within the fuel tank. The FTPT indication of zero pressure may be true and thus indicate an EVAP system leak (e.g., a vacuum is not formed in the EVAP system during pulldown, therefore air may be entering the EVAP system such that pressure within the EVAP system is equal to ambient pressure). Alternatively, the FTPT may indicate zero pressure when positive pressure or vacuum are present in the fuel tank due to the FTPT being stuck at a zero range. In a third example, the FTPT may accurately indicate zero pressure in the fuel tank due to a stuck CPV, for example, when the CPV is stuck partially or fully closed. Method 300 proceeds to FIG. 5 to determine a cause of the FTPT zero pressure reading.

FIG. 4 shows a graph 400 illustrating an example of EVAP gross leak detection pulldown, as described in FIG. 3. The ordinate indicates pressure within the fuel tank in units of in $H_2O$ and the abscissa shows time in seconds. The graph 400 includes plot 402 illustrating a first vacuum pulldown and plot 404 illustrating a second vacuum pulldown. A first threshold 406 shows a target vacuum. The first threshold 406 is a non-zero, negative threshold, where negative pressure indicates a vacuum. In the example of FIG. 4, the target vacuum is −8 in $H_2O$. Additionally, a plot 410 shown below the first threshold with respect to the ordinate illustrates four sub-phases of the vacuum phase of the example EONV test, as described above. Amplitudes of plot 410 are independent of pressure. The ordinate extends to include the plot 410 so that the first threshold 406 may be included in the graph 400. Phases of the vacuum pulldown are indicated by time markers t0-t3, where t0 to t1 is phase zero, t1 to t2 is phase one, t2 to t3 is phase two, and t3 and beyond is phase four. The duration between t0 and t1 indicates a first duration and, at t1, the FTPT measures fuel tank pressure to determine if fuel tank pressure has been pulled down to the target vacuum. In the example of FIG. 4, the first duration is 90 seconds.

At time t0, EVAP gross leak detection pulldown begins, for example, as described in FIG. 3. The CPV is open, the CVS is closed, and the VBV is open. The CPV operates at a low duty cycle to pull vacuum into the EVAP system. For example, the CPV alternates between a fully closed position and a fully open position at a rate of 10% (e.g., the CPV is open for 10% of the first duration).

In one example, as shown by plot 402, pressure within the fuel tank as measured by the FTPT decreases between times t0 and t1, indicating formation of a vacuum. At t1, plot 402 indicates pressure within the fuel tank is equal to the target vacuum −8 in $H_2O$ by being equal to the first threshold 406. Pulldown of pressure in the fuel tank to the target vacuum as indicated by the FTPT may indicate that a vacuum has formed in the fuel tank and therefore the EVAP system may be under nominal operation with no detected leaks. This may correspond to 310 of FIG. 3 and the controller may proceed with EVAP system diagnostics. The vacuum pulldown transitions to phase one between times t1 and t2, where plot 402 is equal to the first threshold 406. At t2, the vacuum pulldown transitions to phase two, and fuel tank pressure gradually increases between time t2 and t3. Pressure in the fuel tank may increase (e.g., vacuum decreases) during phase three due to opening of the CVS. At t3, the vacuum pulldown transitions to phase three, which may include further EVAP system diagnostics.

In a second example, as shown by plot 404, pressure within the fuel tank initially decreases between times t0 and t1 and is approximately equal to 0 in $H_2O$ at time t1. The FTPT indicates zero pressure in the fuel tank at t1, showing that fuel tank pressure was not pulled down to the target vacuum in the first duration. This may be due to a true zero pressure in the fuel tank due to a leak in the EVAP system (e.g., a break in a conduit of the EVAP system such that pressure within the EVAP system is equal to ambient pressure), the FTPT being stuck at the zero pressure reading, or the CPV stuck fully or partially closed. A second example method, described in FIG. 5, may be implemented to determine if the FTPT indication is a true indication of zero pressure. The second example method of FIG. 5 may further indicate a cause of the FTPT zero pressure reading in the case where the FTPT indication of zero pressure is inaccurate (e.g., pressure within the fuel tank is not zero).

FIG. 5 shows an example method 500 for determining a cause of a FTPT zero pressure reading. Method 500 may be a continuation from 312 of method 300 of FIG. 3, thus method 500 is implemented in response to the FTPT reading ambient pressure during a diagnostic of an evaporative emissions system (e.g., pressure in the fuel tank may not have been pulled down to the target vacuum, as indicated by the FTPT). However, in the case that the FTPT is inaccurate, pressure in the fuel tank may still have been pulled down to the target vacuum regardless of the zero pressure indication by the FTPT. Method 500 is implemented when the engine of the vehicle is running.

At 502, method 500 includes commanding the CPV off (e.g., closed, not duty cycling) for a first duration. In one example, the first duration is ten minutes. In another example, the first duration may be greater than or less than ten minutes. Commanding the CPV off for the first duration while the engine is running may allow vapor from the fuel tank to load the canister (e.g., as opposed to purging the canister when the engine is running and the CPV is open/ duty cycling). As the canister is loaded with fuel vapor, canister temperature may increase, e.g., the canister undergoes an exothermic reaction.

At 506, method 500 includes closing the CVS and commanding the CPV on (e.g., duty cycle) for a second duration. The CPV duty cycle may be 20% (e.g., the CPV is open for 20% of a cycle period). The second duration may be ten seconds, in one example, and may be greater or less than ten seconds in other examples. Cycling the CPV while the CVS is closed may draw vacuum on the EVAP system.

At 508, method 500 includes commanding the CPV off. If the EVAP system is intact (e.g., no leaks), vacuum may be trapped within the EVAP system. At 510, method 500 includes opening the CVS. Opening the CVS may result in air rushing into the canister and desorbing fuel vapor trapped in the canister, which may cause a temperature change in the canister. For example, the canister may experience an endothermic reaction, where activated carbon (e.g., canister adsorbent) is cooled when fuel vapor desorbs. In one example, an endothermic reaction may be defined as a decrease in canister temperature resulting in the canister temperature being reduced by a threshold temperature. For example, the canister temperature may be reduced by greater than or equal to 5% of an average canister temperature prior to opening the CVS. The endothermic reaction may be an indication that vacuum was present in the fuel tank and air did rush into the canister to desorb trapped fuel vapor. A canister temperature sensor (e.g., a thermocouple, as described in FIG. 2) may sense temperature in the canister, and therefore the occurrence of an endothermic reaction.

If, at 512, it is determined that an endothermic reaction has occurred in the container (e.g., the canister temperature sensor output indicates the canister temperature has decreased by the threshold temperature), method 500 proceeds to 514, where method 500 include setting a diagnostic trouble code (DTC) indicating FTPT inaccuracy, where the FTPT has indicated zero pressure at the fuel tank when the fuel tank was under pressure. Method 500 may also include disabling subsequent EVAP diagnostics which use the FTPT.

Alternatively, when the CVS is opened at 510, air may not rush into the canister, as a vacuum may not have been present in the fuel tank, and the canister may not experience a temperature change. A vacuum may not have been drawn on the fuel tank due to a leak in the EVAP system, in one example, or due to the CPV being stuck closed, in a second example. The canister temperature may remain substantially constant, for example, within 5% of the average canister temperature prior to opening the CVS, as air may not rush into the EVAP system and trapped fuel vapor may not be desorbed. For example, air may not be drawn into the EVAP system from the atmosphere, as the vacuum which draws the air in may not be strong enough to draw air in from the atmosphere, or may be non-existent.

If, at 512, it is determined that an endothermic reaction has not occurred in the canister (e.g., the canister temperature sensor output indicates the canister temperature has remained substantially constant), method 500 proceeds to 516, where method 500 includes commanding the CPV to 100% open. It may be indicated that an endothermic reaction has not occurred and therefore that the FTPT may not be degraded (e.g., may have acceptable operation) when the canister temperature remains within 5% of an average canister temperature, for example, the average canister temperature during method 500 prior to opening the CVS at 510. Commanding the CPV to open 100% may aid in further discerning between the CPV being stuck closed and a leak in the EVAP system. If the CPV is opened 100%, the EVAP system may be fluidically coupled to the intake manifold, which may result in a change to the engine exhaust air-fuel ratio (AFR), as air from the intake manifold may mix with fuel vapor from the canister and fuel tank.

If, at 518, it is determined that the AFR is disturbed, method 500 proceeds to 520, where method 500 includes setting a DTC indicating a leak in the EVAP system. The AFR may be determined to have been disturbed when a change in the AFR is greater than a threshold ratio (e.g., the AFR sensor indicates the AFR changes to be more rich or more lean than the AFR prior to commanding the CPV 100% open). It has been previously determined in method 500 that the zero pressure indication by the FTPT may not be due to a FTPT fault and instead accurately indicates a zero pressure state of the fuel tank (e.g., the EVAP system pressure is equal to ambient pressure). Therefore, when the CPV is commanded to open 100%, a change in the AFR indicates the CPV is opened and a first AFR of the intake manifold mixes with the AFR of the EVAP system. In this example, the zero pressure state of the EVAP system as indicated by the FTPT is determined to be caused by a leak in the EVAP system.

If, at 518, it is determined that the AFR is not disturbed, method 500 proceeds to 522, where method 500 includes setting a DTC indicating the CPV is stuck closed. The AFR may be determined to have not been disturbed when a change in the AFR is less than the threshold ratio (e.g., the AFR is substantially equal, such as within 5% of an average AFR prior to the CPV being commanded open). For example, the first AFR of the intake manifold may be unable to mix with the AFR of the EVAP system, as the closed CPV may prevent fluidic coupling of the intake manifold with the EVAP system. It has been previously determined in method 500 that the zero pressure indication by the FTPT may not be due to a FTPT inaccuracy and the FTPT accurately indicates a zero pressure state of the fuel tank. For example, neither positive pressure nor vacuum may be present in the EVAP system as the CPV may have been stuck closed during vacuum pulldown, as described in FIG. 3. In this way, a cause of the inaccurate zero pressure indication by the FTPT may be determined based on desorption of fuel vapors trapped in the canister and based on the AFR of the EVAP system.

The processes for determining the different outcomes of method 500 (e.g., indicating FTPT fault, indicating leak in EVAP system, and indicating CPV is stuck closed) are shown in FIGS. 6A-6C. FIG. 6A shows a graph 600 illustrating a first example zero pressure diagnostic cycle, where the FTPT inaccurately indicates zero pressure in the fuel tank (e.g., positive pressure and/or vacuum is present in the fuel tank). FIG. 6B shows a graph 620 illustrating a second example zero pressure diagnostic cycle, where the FTPT accurately indicates zero pressure in the fuel tank caused by a leak in the EVAP system. FIG. 6C shows a graph 640 illustrating a third example zero pressure diagnostic cycle, where the FTPT accurately indicates zero pressure in the fuel tank caused by the CPV being stuck closed.

Each of FIGS. 6A-C include plots indicating, on the ordinate, a CPV state (on/off), a CVS state (open/closed), a canister load (increasing from zero), a canister temperature (increasing from zero), and an EVAP system pressure (negative to positive). The EVAP system pressure is the actual EVAP system pressure and might not be equal to the FTPT reading of EVAP system pressure. Additionally, FIGS. 6B-C each include a plot indicating, on the ordinate, change to an AFR of the EVAP system. For example, the ordinate ranges from lean to rich, where deviation from a median value indicates a rich AFR (e.g., more fuel than air) or a poor AFR (e.g., more air than fuel). The abscissa for all plots shows time in seconds and time markers t0 to t4 on graph 600 and t0 to t5 on each of the graph 620 and graph 640 indicate times of interest during the zero pressure diagnostic cycles.

Turning to FIG. 6A, at t0, a first plot 602 indicates the CPV is on (e.g., duty cycling or open), a second plot 604 indicates the CVS is open, a third plot 606 indicates a low canister load, a fourth plot 608 indicates a low canister temperature, and a fifth plot 610 indicates positive pressure in the EVAP system.

At time t1, the CPV is commanded off (e.g., closed) and the CVS remains open. As described in FIG. 5, when the CPV is commanded off and the engine is running, the canister may be loaded with fuel vapor (e.g., the canister load increases) and, as a result, canister temperature increases. The EVAP system pressure may remain equal to the EVAP system pressure prior to t1, as the EVAP system is fluidically coupled to the atmosphere via the open CVS, preventing vacuum or positive pressure formation in the EVAP system. Also as described in FIG. 5, the CPV may be off and the CVS may be open for a first duration (e.g., between t1 and t2).

At time t2, the CPV is duty cycled (e.g., alternates between open and closed) and the CVS is closed. The canister load is a first, positive value and the canister temperature is a second, positive value. In one example, the CPV may be operated at a 20% duty cycle, where the CPV is open for 20% of the second duration. Also as described in FIG. 5, the CPV may be duty cycled for a second duration (e.g., between t2 and t3). The second duration may be less than the first duration. As a result of duty cycling the CPV while the CVS is closed, a vacuum is drawn on the EVAP system. As shown by the fifth plot 610, EVAP system pressure decreases between time t2 and t3, crossing a threshold 612 indicating zero pressure, below which the EVAP system is under vacuum.

At time t3, the CPV is commanded off and the CVS remains closed. The canister load may be equal to the canister load prior to t3 and the canister temperature may be equal to the canister temperature prior to t3. Commanding the CPV off and therefore isolating the EVAP system from both the intake manifold and from the atmosphere (e.g., due to the CVS remaining closed) may trap the vacuum within the EVAP system. As previously described, the fifth plot 610 shows that the EVAP system is under vacuum while the FTPT indicates the EVAP system is under zero pressure.

The inaccuracy of the FTPT is further validated at t4, where the CVS is opened while the CPV remains off. The canister load and canister temperature decrease, and the EVAP system pressure increases (e.g., the vacuum is dissipated). Opening the CVS may allow air to rush into the canister and desorb trapped fuel vapor. As a result of vapor desorption, the canister experiences an endothermic reaction due to cooling of the carbon bed of the canister. Air is pulled into the canister by the EVAP system vacuum, thus when an endothermic reaction in the canister is detected, it may be determined that the EVAP system was under a non-zero pressure (e.g., vacuum), therefore the FTPT inaccurately indicated the zero pressure state of the EVAP system.

As described in FIG. 5, determination that the FTPT inaccurately indicated the zero pressure state of the EVAP system may result in a DTC being set. The DTC may be interpreted as a vehicle operator or vehicle mechanic that the FTPT may be degraded.

Turning now to FIG. 6B at t0, a first plot 622 indicates the CPV is on, a second plot 624 indicates the CVS is open, a third plot 626 indicates a low canister load, a fourth plot 628 indicates a low canister temperature, a fifth plot 630 indicates positive pressure in the EVAP system, and a sixth plot 632 indicates an AFR. The sixth plot 632 branches into a first branch 634, indicating a rich AFR, and a second branch 636, indicating a lean AFR.

At time t1, the CPV is commanded off (e.g., closed) and the CVS remains open. As described in FIG. 5, when the CPV is commanded off and the engine is running, the canister may be loaded with fuel vapor (e.g., the canister load increases) and, as a result, canister temperature increases. The EVAP system pressure may remain equal to the EVAP system pressure prior to t1, as the EVAP system is fluidically coupled to the atmosphere via the open CVS, preventing vacuum or positive pressure formation in the EVAP system. Also as described in FIG. 5, the CPV may be off and the CVS may be open for a first duration (e.g., between t1 and t2). The AFR is equal to a first value, indicating no change to the AFR between t0 and t1.

At time t2, the CPV is duty cycled (e.g., alternates between open and closed) and the CVS is closed. The canister load is a first, positive value and the canister temperature is a second, positive value. In one example, the CPV may be operated at a 20% duty cycle, where the CPV is open for 20% of the second duration. Also as described in FIG. 5, the CPV may be duty cycled for a second duration (e.g., between t2 and t3). The second duration may be less than the first duration. As a result of duty cycling the CPV while the CVS is closed, a vacuum may be drawn on the EVAP system. However, as shown by the fifth plot 630, EVAP system pressure does not change between time t0 and t5 (e.g., EVAP system pressure is equal to zero). This may be due to a leak in the EVAP system, as further described in FIG. 6B, or due to the CPV being stuck closed, as described in FIG. 6C.

At time t3 of FIG. 6B, the CPV is commanded off and the CVS remains closed. The canister load may be equal to the canister load prior to t3, the canister temperature may be equal to the canister temperature prior to t3, the EVAP system pressure may be equal to the EVAP system pressure prior to t3, and the AFR may be equal to the AFR prior to t3. Commanding the CPV off and therefore isolating the EVAP system from both the intake manifold and from the atmosphere (e.g., due to the CVS remaining closed) may trap vacuum within the EVAP system. However, as previously described, the fifth plot 630 shows that a vacuum is not present within the EVAP system, thus the FTPT accurately indicates the EVAP system is under zero pressure.

The accuracy of the FTPT is further validated at t4, where the CVS is opened while the CPV remains off. The canister load, canister temperature, and the EVAP system pressure are equal to respective values prior to t4. As a vacuum has not been formed in the EVAP system, opening the CVS might not result in a rush of air into the canister, and thus fuel vapor trapped in the canister may not be desorbed. Canister temperature remains equal to canister temperature prior to the CVS being opened, as an endothermic reaction might not occur.

At t5, the cause of zero pressure within the fuel tank is determined. The CVS remains open and the CPV is commanded on (e.g., opened). In the example of FIG. 6B, opening the CPV may fluidically couple the EVAP system to the intake manifold and the AFR of the intake manifold may mix with the AFR of the EVAP system, therefore the AFR may change. As indicated by the first branch 634, the AFR may become more rich, for example, when the intake manifold AFR comprises more fuel or less air than the EVAP system AFR. As indicated by the second branch 636, the AFR may become more lean, for example, when the intake manifold AFR comprises more air or less fuel than the EVAP system AFR. Either of the examples shown in the first branch 634 and the second branch 636 indicate that the zero pressure reading of the FTPT may be caused by a leak in the EVAP system. Since the CPV was able to open and close during vacuum pulldown, a vacuum may have begun to form in the EVAP system but may have been dissipated via a leak in the EVAP system such that any vacuum buildup was undetectable.

As described in FIG. 5, this indication may result in the controller setting a DTC indicating a cause of the zero pressure reading. In this way, the vehicle operator and/or a mechanic may interpret the FTPT as accurate and perform other system diagnostics (e.g., smoking the EVAP system) to determine a location of the leak.

Turning now to FIG. 6C at t0, a first plot 642 indicates the CPV is off, for example, stuck closed. As described herein, when the CPV is off, the CPV is closed and therefore the intake manifold and the EVAP system are not in fluidic communication. A second plot 644 indicates the CVS is open, a third plot 646 indicates a low canister load, a fourth plot 648 indicates a low canister temperature, a fifth plot 650 indicates positive pressure in the EVAP system, and a sixth plot 652 indicates an AFR.

At time t1, the CPV is off and the CVS remains open. As described in FIG. 5, when the CPV is commanded off and the engine is running, the canister may be loaded with fuel vapor (e.g., the canister load increases) and, as a result, canister temperature increases. The EVAP system pressure may remain equal to the EVAP system pressure prior to t1, as the EVAP system is fluidically coupled to the atmosphere via the open CVS, preventing vacuum or positive pressure formation in the EVAP system. Also as described in FIG. 5, the CPV may be off and the CVS may be open for a first duration (e.g., between t1 and t2). The AFR is equal to a first value, indicating no change to the AFR between t0 and t1.

At time t2, the CPV is commanded to duty cycle, however the CPV is stuck closed. The CVS is closed. The canister load is a first, positive value and the canister temperature is a second, positive value. Since the CPV is not duty cycled, a vacuum may not be drawn on the EVAP system (e.g., EVAP system pressure does not change between time t0 and t5 and is equal to zero). When the CPV is stuck closed, the EVAP system may be isolated from the intake manifold and therefore the engine may not pull a vacuum on the EVAP system via the intake manifold when the CVS is closed.

At time t3, the CPV remains off and the CVS remains closed. The canister load may be equal to the canister load prior to t3, the canister temperature may be equal to the canister temperature prior to t3, the EVAP system pressure may be equal to the EVAP system pressure prior to t3, and the AFR may be equal to the AFR prior to t3. Commanding the CPV off and therefore isolating the EVAP system from both the intake manifold and from the atmosphere (e.g., due to the CVS remaining closed) may trap vacuum within the EVAP system. However, as previously described, the fifth plot 650 shows that a vacuum is not present within the EVAP system, thus the FTPT accurately indicates the EVAP system is under zero pressure.

The accuracy of the FTPT is further validated at t4, where the CVS is opened while the CPV remains off. The canister load, canister temperature, and the EVAP system pressure are equal to respective values prior to t4. As a vacuum has not been formed in the EVAP system, opening the CVS might not result in a rush of air into the canister, and thus fuel vapor trapped in the canister may not be desorbed. Canister temperature remains equal to canister temperature prior to the CVS being opened, as an endothermic reaction might not occur.

At t5, the cause of zero pressure within the fuel tank is determined. The CVS remains open and the CPV is commanded on (e.g., opened). However, in the example of FIG. 6A, although the CPV is commanded on, the CPV may remain stuck in the closed position. As the CPV is not opened, the EVAP system may remain isolated from the intake manifold, therefore the AFR might remain equal to the AFR prior to t5. An unchanged AFR upon commanding the CPV to open may indicate that the zero pressure reading of the FTPT may be caused by the CPV being stuck in the closed position.

As described in FIG. 5, this indication may result in the controller setting a DTC indicating a cause of the zero pressure reading. In this way, the vehicle operator and/or a mechanic may interpret the FTPT as accurate and repair or replace the CPV.

In this way, determining a cause of a zero pressure indication by a FTPT may preserve integrity of the EVAP system by preventing subsequent diagnostics from being run that use the FTPT when the FTPT is indicated to be inaccurate. When the FTPT is indicate to accurately output a zero pressure indication, the cause of zero pressure within the EVAP system may be identified and an operator or technician may be notified of the cause, which may allow for repair/replacement of degraded parts and retention of non-degraded parts.

The technical effect of diagnosing a degraded FTPT is that vehicle emissions may be reduced and vehicle non-operational periods may be reduced due to accurate identification of degraded components of the EVAP system.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The disclosure also provides support for a method comprising: in response to a fuel tank pressure sensor reading ambient pressure during a diagnostic of an evaporative emissions system, loading a canister with fuel vapors, applying vacuum in the evaporative emissions system, opening a valve to ambient, and indicating a degradation of the fuel tank pressure sensor if the canister undergoes an endothermic reaction resulting in a canister temperature being reduced by a threshold temperature. In a first example of the method, the valve is a canister vent valve. In a second example of the method, optionally including the first example, vacuum is applied via a pump. In a third example of the method, optionally including one or both of the first and second examples, the method further comprises sensing canister temperature via a temperature sensor. In a fourth example of the method, optionally including one or more or each of the first through third examples, the method further comprises: in response to degradation of the fuel tank pressure sensor, disabling subsequent evaporative emissions system diagnostics. In a fifth example of the method, optionally including one or more or each of the first through fourth examples, the method further comprises: indicating acceptable operation of the fuel tank pressure sensor if a temperature of the canister remains substantially constant. In a sixth example of the method, optionally including one or more or each of the first through fifth examples, the evaporative emissions system further includes a canister purge valve. In a seventh example of the method, optionally including one or more or each of the first through sixth examples, vacuum is applied via an engine intake manifold via the canister purge valve. In an eighth example of the method, optionally including one or more or each of the first through seventh examples, the method further comprises: distinguishing between a leak in the evaporative emissions system and the canister purge valve being stuck closed during the diagnostic of the evaporative emissions system with the fuel tank pressure sensor reading ambient pressure. In a ninth example of the method, optionally including one or more or each of the first through eighth examples, the method further comprises opening the canister purge valve, wherein the distinguishing includes: indicating the leak in response to a change in an exhaust air-fuel ratio greater than a threshold, and indicating the canister purge valve being stuck closed in response to the change in the exhaust air-fuel ratio being less than the threshold.

The disclosure also provides support for a system, comprising: an evaporative emissions system having a canister, a fuel tank pressure sensor, a canister temperature sensor, a canister purge valve, and a canister vent valve, and an electronic controller configured with non-transitory instructions that when carried out: sense fuel tank pressure as being within a threshold of ambient pressure, and in response thereto, load the canister with fuel vapors, apply vacuum in the evaporative emissions system, open the canister vent valve to ambient, and indicate a degradation of the fuel tank pressure sensor in response to an output of the canister temperature sensor being reduced by a threshold temperature. In a first example of the system the instructions further including: in response to degradation of the fuel tank pressure sensor, disabling subsequent evaporative emissions system diagnostics. In a second example of the system, optionally including the first example the instructions further including: indicating acceptable operation of the fuel tank pressure sensor if the output of the canister temperature sensor remains substantially constant. In a third example of the system, optionally including one or both of the first and second examples the instructions further including: distinguishing between a leak in the evaporative emissions system and the canister purge valve being stuck closed during the evaporative emissions system diagnostic with the fuel tank pressure sensor reading ambient pressure. In a fourth example of the system, optionally including one or more or each of the first through third examples the instructions further including: opening the canister purge valve, wherein the distinguishing includes: indicating the leak in response to a change in an exhaust air-fuel ratio greater than a threshold ratio, and indicating the canister purge valve being stuck closed in response to the change in the exhaust air-fuel ratio being less than the threshold ratio.

The disclosure also provides support for a method comprising: distinguishing between each of a fuel tank pressure sensor degradation, a leak in an evaporative emissions system having a canister, and a canister purge valve being stuck closed in response to an ambient pressure reading by the fuel tank pressure sensor, and during the ambient pressure reading, a temperature change of the canister and an engine exhaust air-fuel ratio. In a first example of the method, distinguishing includes opening a canister vent valve and monitoring a temperature of the canister. In a second example of the method, optionally including the first example, the fuel tank pressure sensor is determined to be degraded when, upon opening the canister vent valve the temperature change of the canister is endothermic. In a third example of the method, optionally including one or both of the first and second examples when the temperature change of the canister is substantially equal to zero, the canister purge valve is commanded open and the engine exhaust air-fuel ratio is monitored to distinguish between the leak in the evaporative emissions system and the canister purge valve being stuck closed. In a fourth example of the method, optionally including one or more or each of the first through third examples the evaporative emissions system is determined to have a leak when the air-fuel ratio is disturbed and the canister purge valve is determined to be stuck closed when the air-fuel ratio is substantially equal to a single value.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
in response to a fuel tank pressure sensor reading ambient pressure during a diagnostic of an evaporative emissions system, loading a canister with fuel vapors, applying vacuum in the evaporative emissions system, opening a valve to ambient, and indicating a degradation of the fuel tank pressure sensor if the canister undergoes an endothermic reaction resulting in a canister temperature being reduced by a threshold temperature.

2. The method of claim 1 wherein the valve is a canister vent valve.

3. The method of claim 1 wherein vacuum is applied via a pump.

4. The method of claim 1 further comprising sensing canister temperature via a temperature sensor.

5. The method of claim 1, further comprising:
in response to degradation of the fuel tank pressure sensor, disabling subsequent evaporative emissions system diagnostics.

6. The method of claim 1, further comprising:
indicating acceptable operation of the fuel tank pressure sensor if a temperature of the canister remains substantially constant.

7. The method of claim 1, wherein the evaporative emissions system further includes a canister purge valve.

8. The method of claim 7 wherein vacuum is applied via an engine intake manifold via the canister purge valve.

9. The method of claim 7, further comprising:
distinguishing between a leak in the evaporative emissions system and the canister purge valve being stuck closed during the diagnostic of the evaporative emissions system with the fuel tank pressure sensor reading ambient pressure.

10. The method of claim 9, further comprising:
opening the canister purge valve, wherein the distinguishing includes:
indicating the leak in response to a change in an exhaust air-fuel ratio greater than a threshold; and
indicating the canister purge valve being stuck closed in response to the change in the exhaust air-fuel ratio being less than the threshold.

11. A system, comprising:
an evaporative emissions system having a canister, a fuel tank pressure sensor, a canister temperature sensor, a canister purge valve, and a canister vent valve; and
an electronic controller configured with non-transitory instructions that when carried out: sense fuel tank pressure as being within a threshold of ambient pressure, and in response thereto, load the canister with fuel vapors, apply vacuum in the evaporative emissions system, open the canister vent valve to ambient, and indicate a degradation of the fuel tank pressure sensor in response to an output of the canister temperature sensor being reduced by a threshold temperature.

12. The system of claim 11, the instructions further including:
in response to degradation of the fuel tank pressure sensor, disabling subsequent evaporative emissions system diagnostics.

13. The system of claim 11, the instructions further including:
indicating acceptable operation of the fuel tank pressure sensor if the output of the canister temperature sensor remains substantially constant.

14. The system of claim 13, the instructions further including:
distinguishing between a leak in the evaporative emissions system and the canister purge valve being stuck closed during the evaporative emissions system diagnostic with the fuel tank pressure sensor reading ambient pressure.

15. The system of claim 14, the instructions further including:
opening the canister purge valve, wherein the distinguishing includes:
indicating the leak in response to a change in an exhaust air-fuel ratio greater than a threshold ratio; and
indicating the canister purge valve being stuck closed in response to the change in the exhaust air-fuel ratio being less than the threshold ratio.

16. A method comprising:
distinguishing between each of a fuel tank pressure sensor degradation, a leak in an evaporative emissions system having a canister, and a canister purge valve being stuck closed in response to an ambient pressure reading by the fuel tank pressure sensor, and during the ambient pressure reading, a temperature change of the canister and an engine exhaust air-fuel ratio.

17. The method of claim 16, wherein distinguishing includes opening a canister vent valve and monitoring a temperature of the canister.

18. The method of claim 17, wherein the fuel tank pressure sensor is determined to be degraded when, upon opening the canister vent valve the temperature change of the canister is endothermic.

19. The method of claim 17, wherein, when the temperature change of the canister is substantially equal to zero, the canister purge valve is commanded open and the engine exhaust air-fuel ratio is monitored to distinguish between the leak in the evaporative emissions system and the canister purge valve being stuck closed.

20. The method of claim 19, wherein, the evaporative emissions system is determined to have a leak when the air-fuel ratio is disturbed and the canister purge valve is determined to be stuck closed when the air-fuel ratio is substantially equal to a single value.

* * * * *